Sept. 27, 1960   D. M. SCHWARTZ ET AL   2,953,941
TRANSMISSION

Filed March 28, 1955   10 Sheets-Sheet 1

Inventors
DANIEL M. SCHWARTZ,
THEODORE N. HACKETT,
DUNCAN I. McCALLUM.

By Harold T. Stowell
Attorney

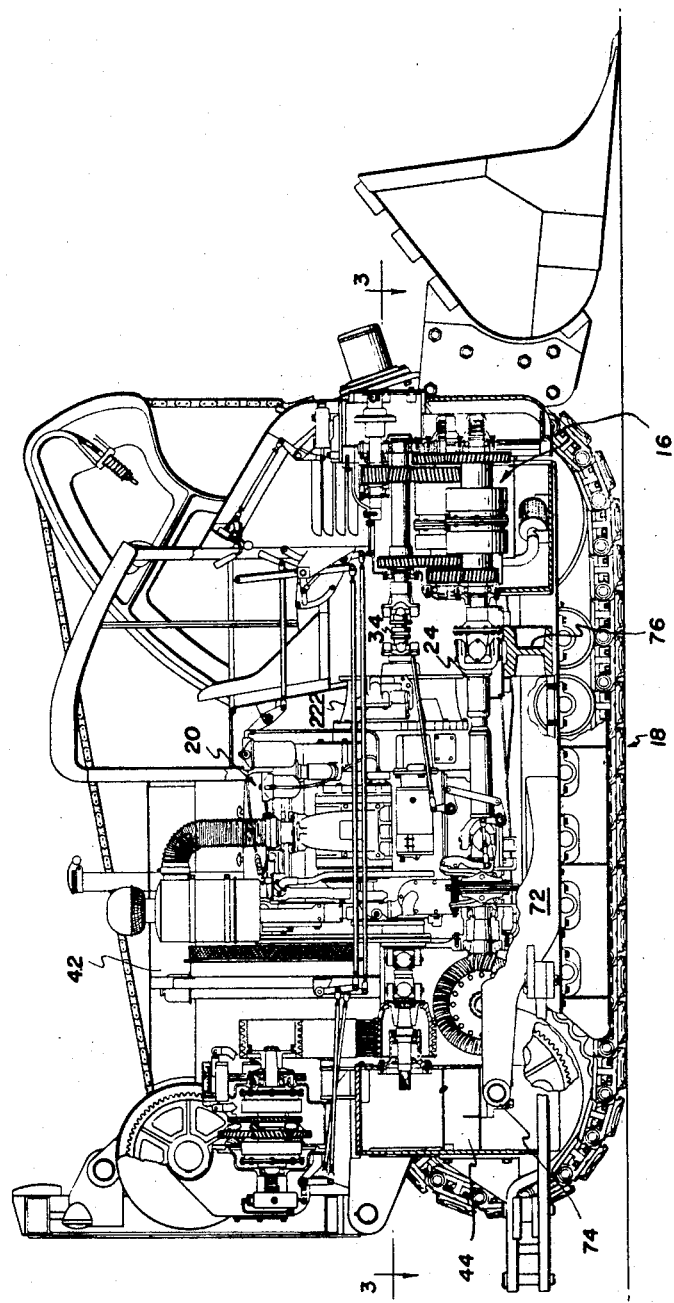

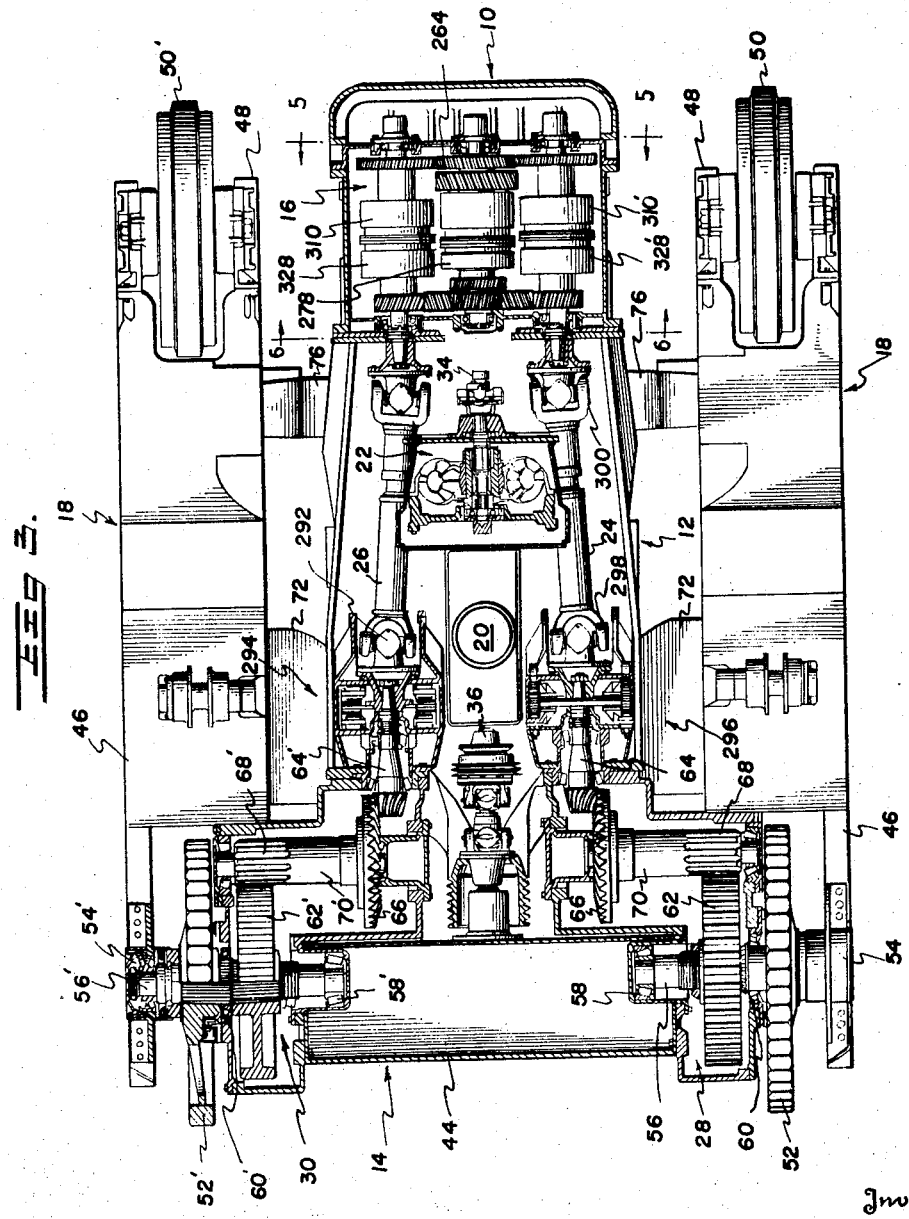

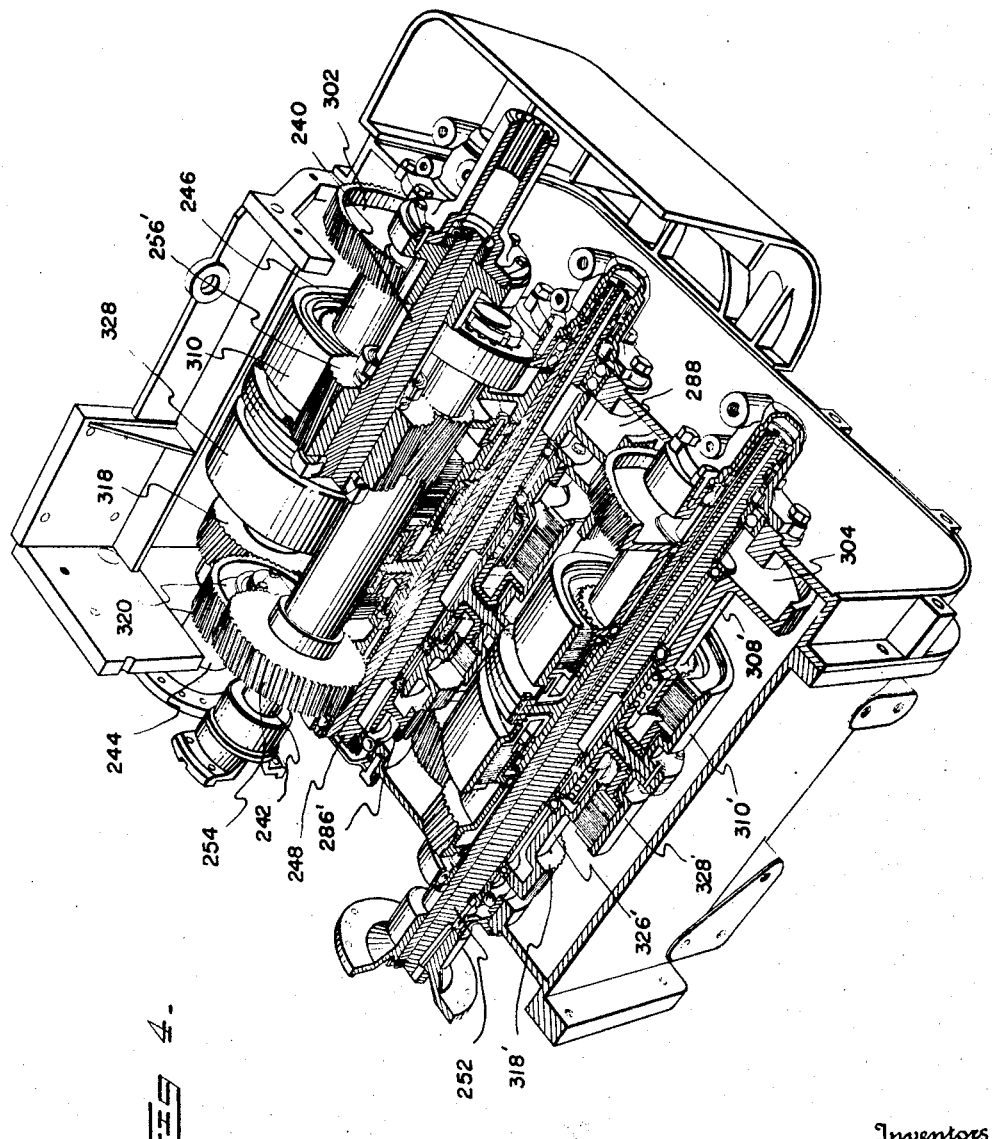

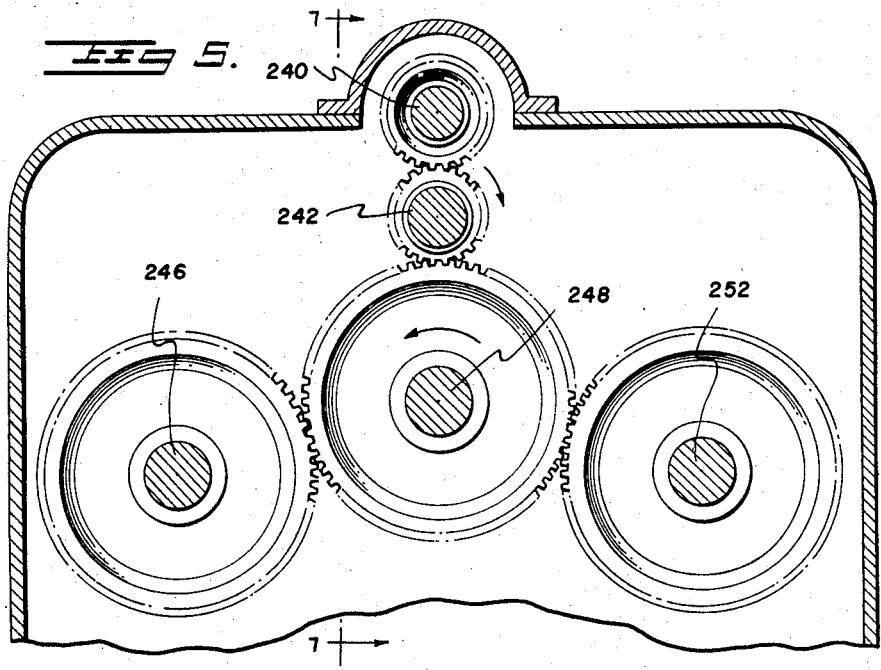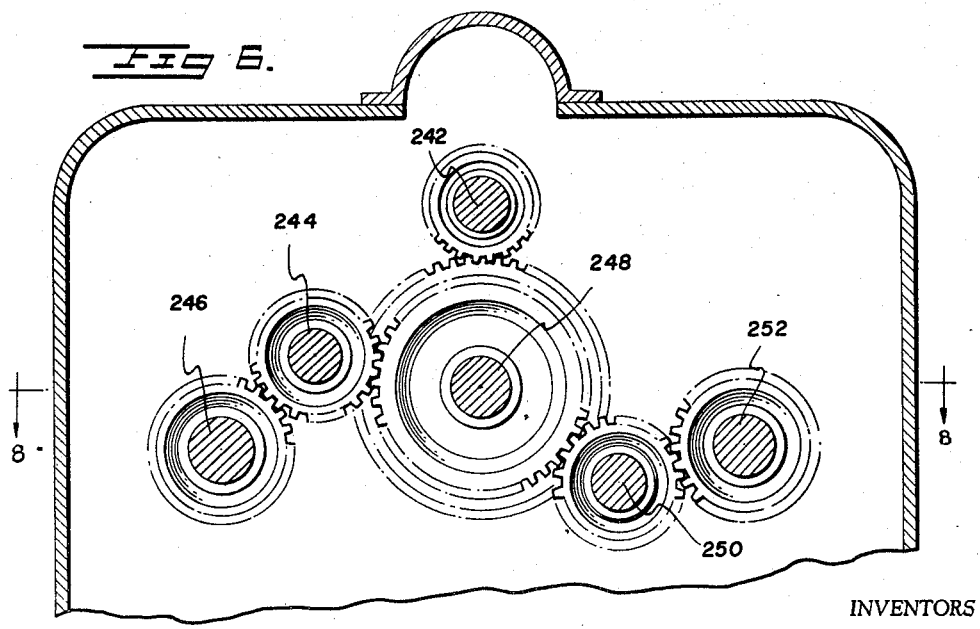

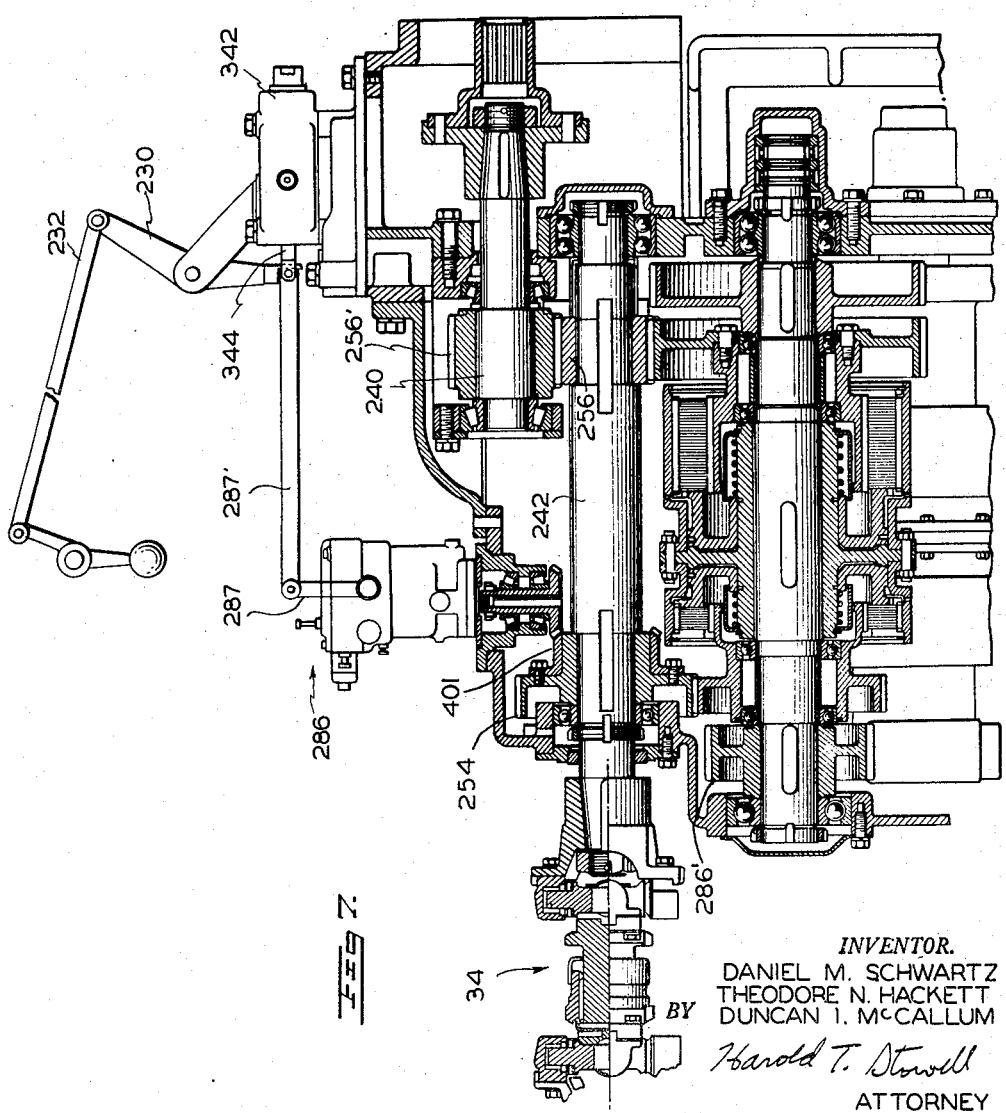

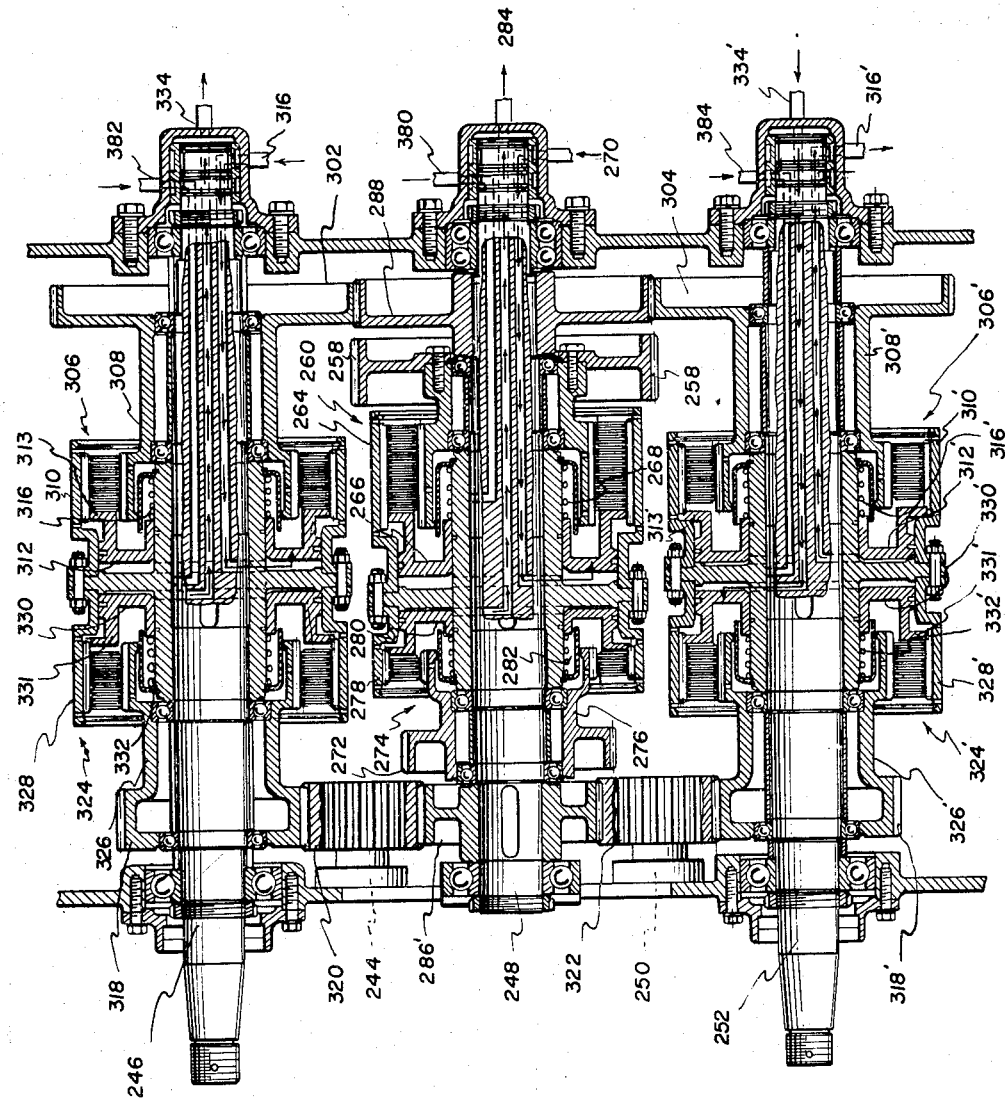

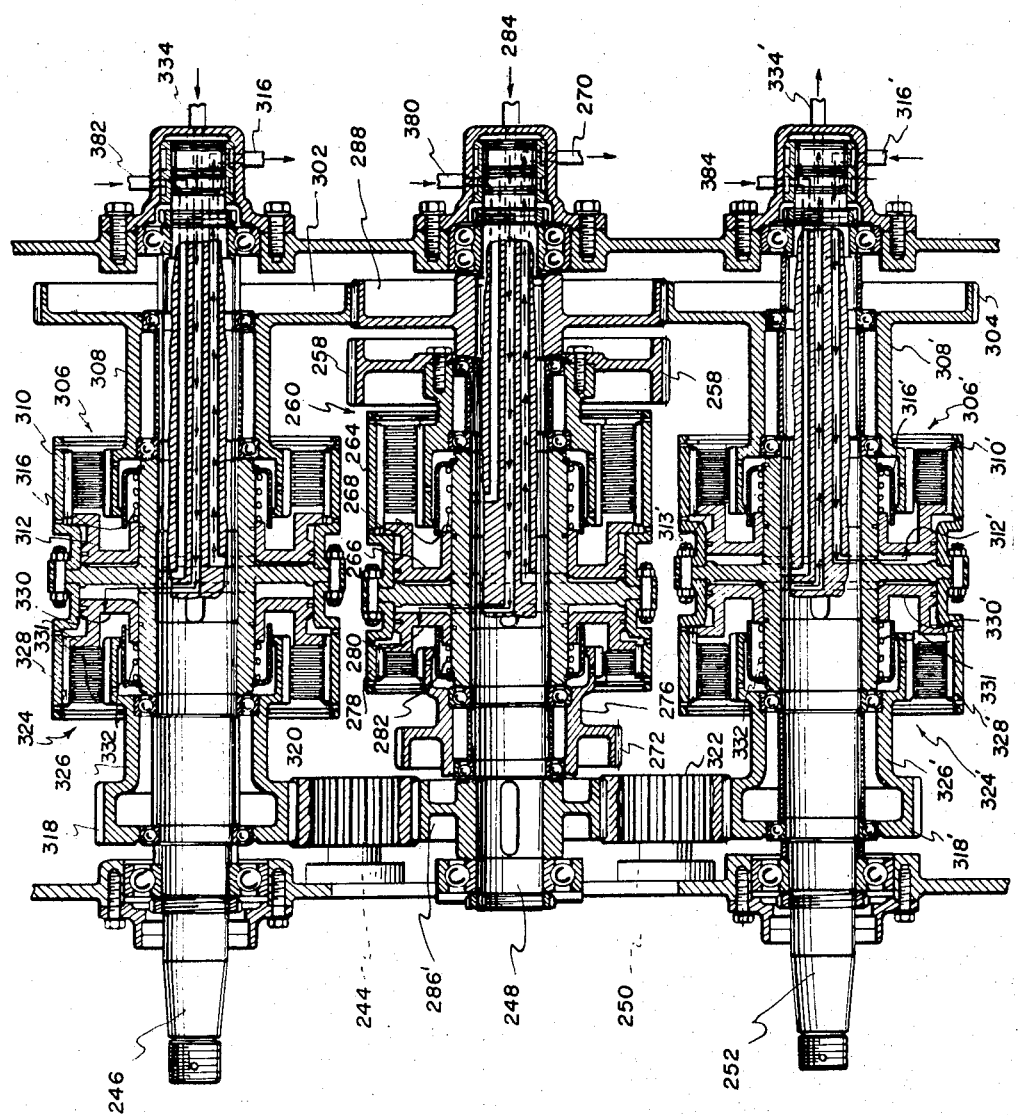

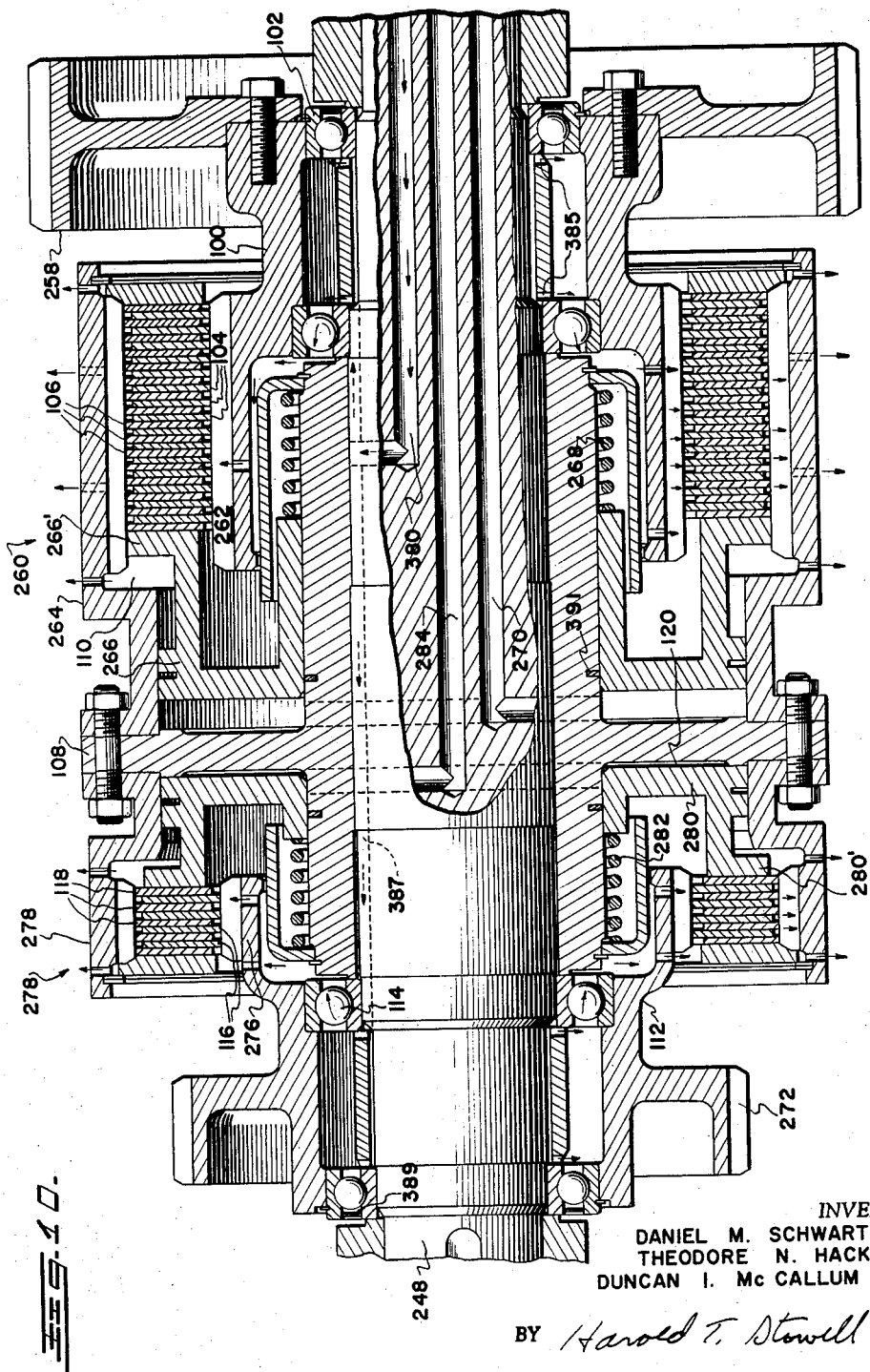

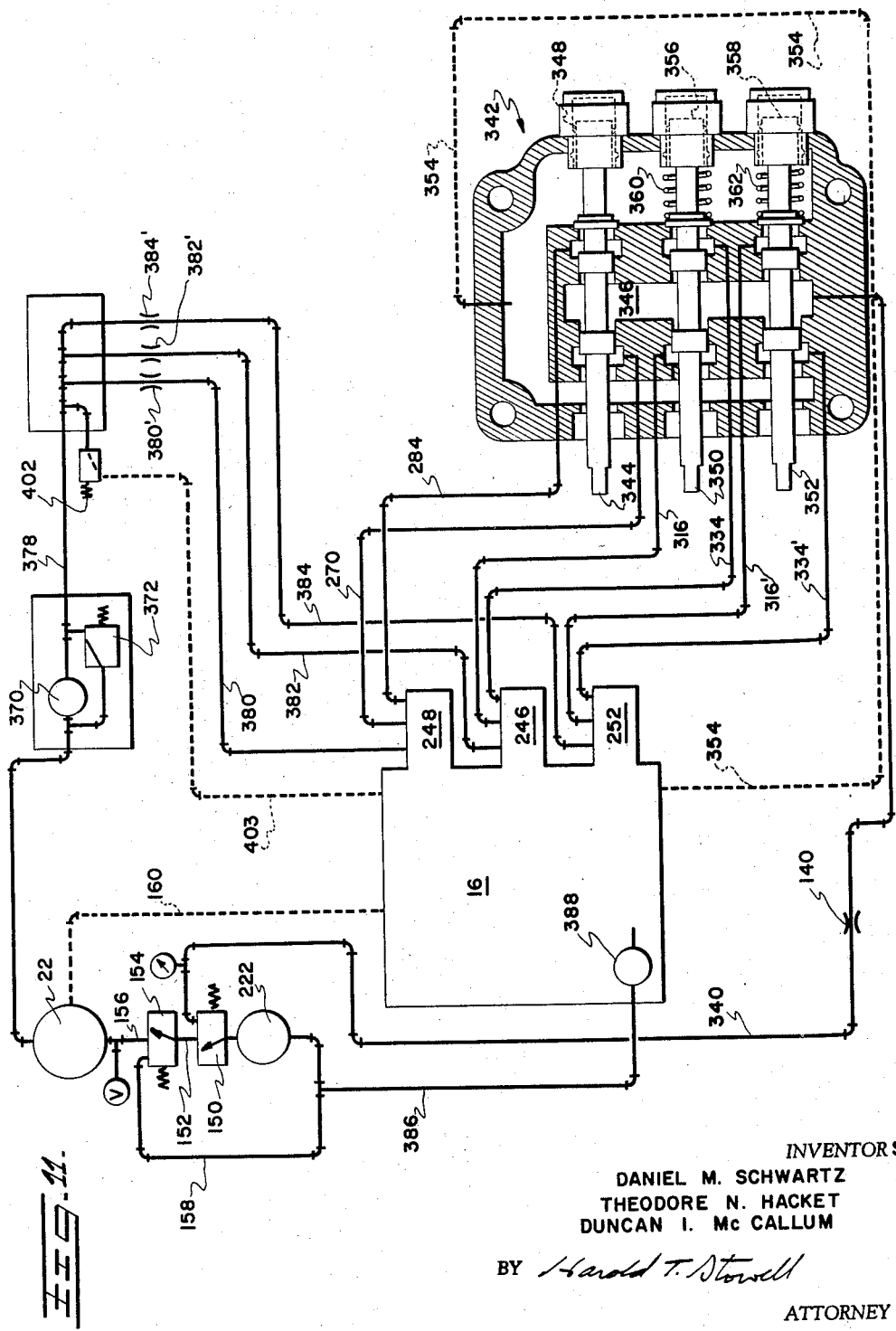

United States Patent Office 2,953,941
Patented Sept. 27, 1960

2,953,941
TRANSMISSION

Daniel M. Schwartz, Theodore N. Hackett, and Duncan I. McCallum, Salt Lake City, Utah, assignors, by mesne assignments, to The Eimco Corporation, Salt Lake City, Utah, a corporation of Delaware Filed Mar. 28, 1955, Ser. No. 497,132

33 Claims. (Cl. 74—665)

This invention relates to a mobile material handling machine that is characterized by its compactness, mobility and ease of control. The invention will be particularly described with reference to such a machine including an overhead bucket supported on a main frame having individually operated crawlers or self-laying tracks.

It is an object of the invention to provide such a machine having a centrally positioned prime mover, with a rear power take-off connected to a material handling structure actuating mechanism, and a forward power take-off connected to a traction transmission.

A further object is to provide drive means for such a machine having all of the power transmitting clutches positioned within the power transmission.

Another object is to provide a material handling machine having dual traction unit drives wherein all of the drive clutches and the power division are all located together in the traction unit transmission.

A further object is to provide a crawler transmission which is of the constant mesh hydraulically controllable type.

Another object is to provide a machine of the class described having improved independently controllable dual axle drive for the ground engaging traction units.

Another object is to provide such a machine wherein the main frame is constructed in three sections, thereby substantially facilitating assembly, repair, and changing of the gauge of the ground engaging traction units.

Another object is to provide a transmission for a machine wherein a single hydraulic system provides pressure fluid for lubrication, operation of the clutches, and for operation of a hydraulic torque converter.

A further object is to provide a pressure fluid system for a pressure fluid actuated transmission including plural fluid pressure actuated clutches wherein the system includes a single restrictor means for reducing the rate of flow of pressure fluid to the plural pressure actuated clutches without reducing the final pressure thereof thereby reducing the sudden shock of engagement of the transmission clutches.

Another object is to provide for restricting of the pressure fluid without reducing the quick release of the plural pressure fluid actuated clutches or the full engagement thereof.

A further object is to provide a power transmission wherein lubrication of the transmission is aided by centrifugal force.

Further objects and advantages are to provide:

A constant mesh transmission having a single power input shaft and dual power output shafts providing independent reversal of each of the output shafts and speed change of the dual output shafts;

A constant mesh transmission wherein reversal in direction and speed change of the output shafts are obtained without reversal of rotation of the gears in the transmission;

A constant mesh transmission wherein all shock of rapid reversal of the output shafts and rapid speed changes are absorbed in clutch plates;

A constant mesh transmission including means for maintaining the power output thereof automatically at a maximum throughout a wide range.

These and other objects and advantages of the invention will appear more clearly from the detailed description in conjunction with the illustrative embodiments shown in the accompanying drawings in which:

Fig. 2 is a side elevation in partial section of the loader of Fig. 1;

Fig. 3 is a section substantially on line 3—3 of Fig. 2 with portions broken away for clarity;

Fig. 4 is an enlarged perspective view in partial section of crawler drive transmission;

Fig. 5 is a section substantially on line 5—5 of Fig. 3 showing the shaft layout of the crawler drive transmission;

Fig. 6 is a section substantially on line 6—6 of Fig. 3 showing the rear shaft layout of the crawler drive transmission;

Fig. 7 is a fragmentary section substantially on line 7—7 of Fig. 5;

Fig. 8 is a section on line 8—8 of Fig. 6 with portions broken away for clarity showing the transmission in low speed drive position;

Fig. 9 is a view similar to Fig. 8 with the drive in high speed reverse drive position;

Fig. 10 is an enlarged fragmentary view in partial section of one of the clutch and gear units of the transmission; and Fig. 11 is a diagrammatic representation of the hydraulic system of the material handling machine.

Figure 1:
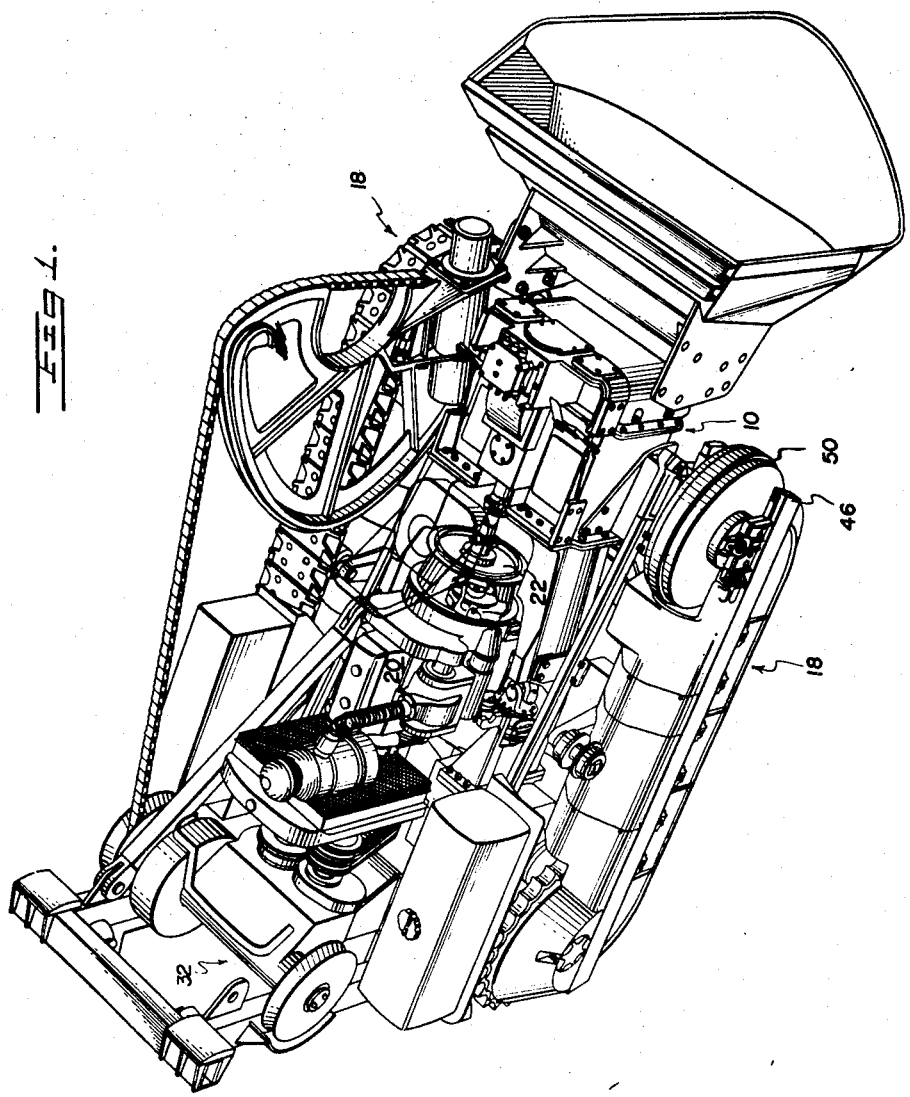
Fig. 1 is a right front perspective view of the overhead material handling machine of the invention with the cab and the motor, and transmission covers, and one of the rocker arms removed.

With particular reference to Figs. 1 through 3 of the drawings, there is shown a material handling apparatus generally embodying the principles of the invention. While the material handling machine shown in the drawings and described hereinafter has an overhead material handling superstructure and endless chain type traction units, it will be evident that other forms of traction units such as wheels could be used and that other types of material handling devices could be carried by the machine without loss of all of the objects and advantages of this invention. The machine has a main frame consisting of three individual and separable sections comprising a forward section 10, a center section 12 and a rear section 14.

The forward section 10 carries the constant mesh hydraulically actuated transmission 16 for the rear drive, endless track type traction units 18.

The center section 12 carries a single prime mover 20, centrally positioned therein, a hydraulic torque converter 22, and a pair of torque shafts designated 24 and 26 which are positioned on either side of the prime mover 20.

The rear section 14 carries the opposed dual drives 28 and 30 for the individually operated crawlers in the lower section and an overhead bucket actuating mechanism including a constant mesh hydraulically actuated bucket transmission, generally designated 32, positioned above the dual drives 28 and 30.

The forward transmission, as to be more fully described hereinafter, is connected to the prime mover through a universal coupling 34 to the torque converter 22, while the rear or bucket transmission 32 is connected to the same prime mover by means of a rearwardly extending power take-off 36.

Each of the endless track units 18 comprises a pair of spaced side channel members 46 and 48 connected in spaced relation by transverse top plates and ribs. The top plates are notched at their front and rear ends to provide clearance for the front idler wheels 50 and 50' and the driven sprocket wheels 52 and 52', respectively.

The outer side channel members 46 are of a greater length than and extend rearwardly of the corresponding inner channel members 48. Secured to these rearward extensions of the outboard channel members are self-aligning roller bearing units 54 and 54'. The inner bearing races of the units are carried by the line axle shafts 56 and 56' of each drive unit.

Axle 56 is journalled to the right rear drive housing by means of inboard and outboard bearings 58 and 60. Also secured to the axle are sprocket wheel 52 and gear 62. The axle, sprocket and gear are driven, as to be more fully described hereinafter, through pinion 64 and gears 66 and 68 on the intermediate shaft 70.

The support for axle 56' and the drive means therefor are identical to those for the right hand axle 56 and corresponding elements have been given primed reference numerals.

Each track frame unit is provided with a generally rearwardly extending diagonal brace member 72. The forward ends of the braces are secured, preferably by welding, to their corresponding inner track channel members 48, forwardly of the bearing members 54 and 54' on the complementary outer channel members.

The rearward ends of the diagonal braces 72 are each pivotally connected to the under side of the spacer frame 44 so that the track units are free to pivot about the main frame with the outboard ends of live axles 56 and 56' forming one of the pivot points and bearing 74, on center with the axles, forming the other pivot point.

The forward end of the main frame is supported by an equalized bar 76, which bar is mounted at its center on the center section of the main frame 12. The ends of the bar are in engagement with their respective track frames.

It will be apparent from the foregoing description of the main and track frames that by constructing the track frames as separate units from the main frame, and by constructing the main frame from a plurality of independent sections, the initial construction costs, assembly, maintenance and repair of the material handling machine are substantially reduced. It will further be evident with this type of construction machines having various track widths may be economically constructed from a minimum of tractor parts. For example, a material handling machine having a wider or narrower track gauge may be constructed from the machine shown in Fig. 3 without modification of the track frames 18, or the forward section 10, and the center section 12 of the main frame. The smaller or larger sections required are merely the spacer frame 44, final drives 28 and 30 and diagonal brace members 72.

It is also evident that a change of gauge could be readily made in the field by merely attaching the main frame sections 10 and 12 to a modified rear section 14 and track frames.

The constant mesh hydraulically controlled transmission 16 for the crawler tracks will be particularly described with reference to Figs. 4 through 11 of the drawings. Journalled in the housing in the forward section 10 of the main frame, are shafts 240, 242, 244, 246, 248, 250 and 252.

The prime mover 20 is connected in driving relationship to shaft 242, through the conventional hydraulic fluid type torque converter 22, and the universal coupling 34.

Shaft 242 has keyed thereto two gears 254 and 256. Gear 254 is the high speed gear and gear 256 is the low speed gear, as to be further described hereinafter.

Stub shaft 240 is driven by gear 256 through gear 256' keyed to the shaft. The stub shaft provides a front power take-off to drive various tractor attachments as is well known in the art. The teeth of gear 256 also engage the teeth of gear 258 which gear is rotatably mounted on shaft 248, the high-speed low-speed shaft of the transmission.

The high-speed low-speed shaft 248 of the transmission will be described with particular reference to Figs. 7 and 8 and the enlarged detailed view in Fig. 10.

Gear 258 is secured to a sleeve 100 which is rotatably mounted on shaft 248 on bearings 102 so that the sleeve and the gear may rotate independently of shaft 248 and vice versa.

Alternate radially extending clutch discs 104 of multiple disc clutch 260 are secured to the annular portion 262 of sleeve 100 and rotate therewith.

The other discs 106 of clutch 260 are secured to the clutch housing 264 which, in turn, is secured to radial flange 108 which rotates with shaft 248.

A portion of the shaft 248, the radial flange 108 and a portion of the clutch housing 264 provide an annular space 110 adapted to receive a ring-shaped piston 266 provided with a presser plate 266' for the discs 104 and 106. The piston 266 and its connected presser plate 266' are normally urged out of engagement with the clutch discs 204 and 206 by spring 268 whereby the gear 258, the sleeve 100 and clutch discs 104 are free to rotate independently of the shaft 248 and clutch discs 106.

To actuate the clutch 260 so that the shaft 248 is driven through gears 256 and 258 pressure fluid is directed to the head of piston 266 through a conduit 270, a portion of which is provided by an internal passage in the shaft 248 whereby the presser plate 266' causes the frictional engagement between alternate clutch discs 104 and 106.

In Fig. 8 of the drawings, this clutch is shown in the engaged position, while in Fig. 9, this clutch is shown disengaged permitting the gear 258 to turn freely on the shaft 248.

Gear 254 of shaft 242 drivably engages gear 272 which like gear 258 is rotatably mounted on shaft 248 through sleeve 112 which is rotatably mounted on shaft 248 by means of bearings 114. Alternate radially extending clutch discs 116 of multiple disc clutch 274 are secured to the annular portion 276 of sleeve 112 and rotate therewith. The other discs 118 of clutch 274 are secured to the clutch housing 278 which, in turn, is secured to radial flange 108 which rotates with shaft 248.

Clutch 274 like clutch 260 is provided with an annular space 120 adapted to receive a ring-shaped piston 280 carrying a presser plate 280'. The piston 280 and its connected presser plate 280' are normally urged out of engagement with the clutch discs 116 and 118 by spring 282. To actuate the clutch 274 so that shaft 248 is driven through gears 254 and 272 pressure fluid is directed to the head of piston 280 through a conduit 284, a portion of which is provided by an internal passage in the shaft 248. In Fig. 8 of the drawings, this clutch is shown in the disengaged position, while in Fig. 9, it is shown engaged whereby shaft 248 is rotated at a higher speed than when clutch 260 is engaged. Since clutch 274 is the high-speed low-torque clutch the number of pairs of discs in this clutch are less than those shown in the low-speed high-torque clutch 258.

A gear 401 on shaft 242 drives a governor generally designated 286. The governor may be of any standard type and is designed to actuate arm 287 as the speed of rotation of shaft 242 falls below or exceeds a predetermined speed range. However, mechanical governors which provide a snap action when a predetermined speed is reached are preferable, such as the type of governor shown in U.S. Patent 2,252,838. The arm 287 (Fig. 7) of the governor is connected by link 287' to valve spool 344 of valve 342, which spool, as to be more fully described hereinafter, controls the flow of pressure fluid to the piston 280 of clutch 274 and piston 266 of clutch 260 on the high-speed low-speed shaft 248.

The position of spool 344 is also manually controlled through bellcrank 230 and rod 232 as shown in Fig. 7.

The mechanical governor 286 has been found to provide very satisfactory speed and efficiency control, particularly on machines wherein the input shaft of the transmission is driven from a prime mover through a conventional hydraulic type torque converter such as shown at 22. The speed of the output shaft 34 from the torque converter, or the input shaft 242 of the transmission provides a very satisfactory gauge of the torque or power being transmitted from the motor to the torque converter. As the torque transmitted increases, the input shaft 242, which drives the governor, slows down until at peak torque, the torque converter stalls. It is advantageous to operate the torque converter in its most efficient range and preferably at efficiencies above 70 percent, to prevent excessive loads on the torque converter cooling system. It is, therefore, desirable to set the governor 286 to automatically shift the valve spool 344 and, in turn, the transmission to the low-speed gear 258 through clutch 260 when the speed of the input shaft 242 reaches a speed indicating that the torque converter is operating below 70 percent efficiency. Similarly, when the load requirements are decreased, the governor automatically shifts the transmission to high gear through clutch 278.

In addition to the gears 272 and 258 rotatably mounted on shaft 248, this shaft also carries gears 286' and 288 which are keyed thereto. Each of these gears is drivably connected to each of the shafts 246 and 252. Shaft 246 is connected through universal coupling 290 to torque shaft 26 which, in turn, is connected to final drive 30 through universal coupling 292, brake assembly 294, and pinion shaft 64'. The other final drive 28 is connected to the complementary transmission shaft 252 through pinion shaft 64, brake assembly 296, universal coupling 298, torque shaft 24, and universal coupling 300.

Gear 288 of shaft 248 is in constant mesh with gears 302 and 304 rotatably mounted on their respective shafts 246 and 252.

Alternate radially extending clutch discs of multiple disc clutch 306 are secured to the annular extension 308 which rotates with gear 302. The other discs of clutch 306 are secured to the clutch housing 310 which is secured to and rotates with shaft 246. Within the housing is a ring-shaped piston 312 carrying a presser plate 313 spring urged out of engagement with the clutch discs by spring 314.

To actuate the clutch 306 so that shaft 246 is driven through gears 288 and 302 pressure fluid is directed to the head of piston 312 through a conduit 316, a portion of which is provided by an internal passage in the shaft 246. Since the normal direction of rotation of shafts 242 and 248 is as shown by the arrows in Fig. 5, gear 302 and its associated clutch 306 are the forward drive unit for final drive 30.

Gear 304 is drivably connected to shaft 252 in the same manner as described with reference to gear 302 and corresponding parts are given primed reference numerals. The only distinction between these two groups of mechanisms is that while clutch 306 is the forward drive clutch for shaft 246, clutch 306' is the reverse drive clutch for shaft 252. Therefore, in Fig. 9 showing this portion of the transmission, the forward clutch 306 is shown in the engaged position and clutch 306' in the disengaged position.

Gear 286 of shaft 248 is drivably connected to gear 318 rotatably mounted on shaft 246, through idler gear 320 carried by the stub shaft 244. Gear 286 is similarly connected to gear 318', rotatably mounted on shaft 252, through idler 322 carried by the stub shaft 250. The diameters of gears 318 and 318' and gear 286 is of the same ratio as gears 302 and 304 and gear 288, whereby shafts 246 and 252 rotate at the same speed whether driven by gear 288 or gear 286, the two sets of gears being provided so that a reverse direction of rotation of shafts 246 and 252 may be obtained.

Alternate radially extending clutch discs of multiple disc clutch 324 are secured to the annular extension 326 which rotates with gear 318. The other discs of clutch 324 are secured to the clutch housing 328 secured to and rotatable with shaft 246. Within the clutch housing 328 is a ring-shaped piston 330 carrying a presser plate 331 spring urged out of engagement with the clutch discs by spring 332.

To actuate the clutch 324 so that shaft 246 is driven through gears 286, 320 and 318, pressure fluid is directed to the head of piston 330 through a conduit 334, a portion of which is provided by an internal passage in the shaft 246.

Gear 318' is drivably connected to shaft 252 in the same manner as described with reference to gear 318 and shaft 246, and corresponding parts not specifically described hereinbefore, are given primed reference numerals.

The operation of the crawler transmission will be described with reference in particular to Figs. 8, 9 and 11. Fig. 11 is a diagrammatic hydraulic flow diagram of the invention, Fig. 8 shows the transmission in forward low-speed gear and Fig. 9 shows the transmission in reverse high-speed gear.

Pressure fluid for operation of the crawler transmission is obtained from the pump 222 driven by motor 20. Pressure fluid from pump 222 passes through relief valve 150 which prevents excessive pressures in the crawler transmission circuit. The relief valve 150 supplies fluid at a pressure of about 150 pounds per square inch to the crawler control valve 342 through conduit 340 and orifice restrictor 140.

The by-pass 152 from valve 150 supplies pressure fluid to a second relief valve 154, which supplies pressure fluid at about 70 pounds per square inch, through line 156 to the torque converter 22. Fluid at any pressure in excess of 70 pounds per square inch is by-passed through line 158 to line 386 on the suction side of pump 222. A sump line 160 is provided to direct any fluid which passes through the torque converter seals back in to the hydraulic system.

Pressure fluid after leaving the pump 222 and passing through the orificed restrictor 140 passes to the three-spool valve 342. A check valve may be provided in conduit 340 to prevent pressure fluid from flowing from the valve 342 under adverse conditions. Valve spool 344 is the high-speed low-speed spool and controls the flow of pressure fluid within conduits 270 and 284. The valve spool 344 is shown in the neutral position so that the flow of pressure flow from internal valve passage 346 is blocked from entering into either conduit 270 or 284, and conduits 270 and 284 are connected to the sump through line 354 so that clutches 260 and 274 are disengaged. Spring urged detents generally indicated 348 hold the valve spool in the neutral, high or low speed positions.

Valve spools 350 and 352 are the right and left crawler control spools and control flow of pressure fluid in conduits 316 and 334 and 316' and 334', respectively. Each of the spools 350 and 352 is also a three-position spool and each is shown in the neutral position whereby the flow of pressure fluid from internal valve passage 346 is blocked from flowing to conduits 316, 316', 334 and 334'. However, each of said conduits is connected to the sump line 354 when the valve spools are in the neutral position. Spring urged detents generally indicated 356 and 358 for spools 350 and 352, respectively, hold the spools in the neutral position, while valve spool springs 360 and 362, respectively, urge the spools into the neutral position from their forward drive or reverse drive positions. The sump line 354 connects into the lower section of the crawler transmission housing 16.

The orifice restrictor 140 in conduit 340, as hereinbefore described is provided to reduce the sudden shock of engagement of the transmission clutches under full flow of the pressure fluid from the pump 222 without reducing the quick release of the clutches or the full engagement thereof. The orifice restrictor has been found to slow down the flow of pressure fluid to the clutch actuating cylinders whereby the impact of the clutch engagement is materially reduced. However, since the orifice restrictor 140 merely controls the rate of flow of pressure fluid from the pump 222, after the clutch is engaged full pressure from the pump is then maintained on the transmission clutches thus eliminating any danger of excessive clutch slippage.

It has further been found that the orifice restrictor 140 maintains the flow of oil to the torque converter during operation of the transmission clutches instead of permitting a large surge of pressure fluid to the clutches when the transmission clutch valves are operated.

Very satisfactory results are obtained when operating at a pressure of about 150 pounds per square inch at 22 g.p.m. when the conduit 340 has an inside diameter of about ¾ inch and the orifice in the orifice restrictor is 0.193 inch in diameter. Under these conditions, the peak strain and, consequently, the peak stress is reduced about two-thirds whereby the impact on the elements of the transmission is substantially reduced.

From the foregoing description of the crawler transmission, it will be seen that the machine operator by merely manipulating valve spools 344, 350 and 352 of crawler control valve 342 the heavy material handling machine may be run forward or backward at high or low speed, or one of the crawlers may be driven forward while the other is going in the reverse direction or one crawler can be held in the neutral position while the other is driven either forward or backward at high or low speed. It will also be evident that with the constant mesh drive any of these drive combinations may be effected one after the other with great rapidity without damage to the drive mechanism, thus providing a sensitive control for heavy earth moving equipment heretofore unrealized, and that the change from low to high speed may be made without loss of speed or momentum and while transmitting full torque.

Pump 222, besides supplying pressure fluid for the operation of the crawler and bucket transmission, also supplies pressure fluid for the tractor torque converter 22, and lubricant for the crawler transmission as now to be described in reference in particular to Fig. 11.

The excess of pressure fluid supplied to the torque converter is filtered by filter 370, provided with a by-pass valve 372 normally set to open at a pressure of 20 pounds per square inch.

From filter 370, pressure fluid for lubrication is conducted by conduit 378 having branch lines 380, 382 and 384 to the crawler transmission.

A portion of lines 380, 382 and 384 are provided by internal passages in shafts 248, 246 and 252, as more clearly shown in Figs. 8 and 9 of the drawings. From conduits 380, 382 and 384 the lubricant is forced through the bearings and clutches and about the gears of the transmission 16, from which it drains into the lowermost portion of the transmission casing. In Fig. 10 of the drawings lubricant passages are shown at 385 and a lubricant slot in shaft 248 is shown at 387. Similar passages and slots are provided in the other elements of the transmission. The elements of the transmission are also provided with oil seals such as 389 and oil rings 391 as shown in Fig. 10. The pump 222 sucks the liquid therefrom through conduit 386 and filter 388. Branch line 403 connects line 378 to the housing 16 of the transmission through relief valve 402 set to open at about 10 pounds per square inch. This relief valve maintains a pressure of 10 pounds per square inch in lines 380, 382 and 384 to assure complete lubrication of the internal clutch parts and bearings. The conduits 380, 382 and 384 may be provided with orifice restrictors 380', 382' and 384' instead of relief valve 402 to restrict the flow of lubricant to the transmission clutches as it has been found that an excessive flow of lubricant to the clutches has a tendency to cause the clutches to drag. With pressure at about 70 pounds per square inch and conduits 380, 382 and 384 having diameters of about ¼ inch .052 diameter orifices maintaining a flow of about ½ gallon per minute provides very satisfactory results.

From the foregoing description, it will be seen that the present invention presents a basically new mechanical development in the heavy earth moving machinery class whereby the aims, objects and advantages of the invention are fully accomplished.

While only a preferred embodiment of the present invention has been described in detail with reference to the drawings, it will be evident to those skilled in the art that various modifications may be made in the various components of the machine and in the form of the transmission.

This application is a continuation-in-part of our co-pending application Serial No. 377,125 filed August 28, 1953, now Patent No. 2,843,213 dated July 15, 1958, and similar subject matter is disclosed and claimed in our co-pending application Serial No. 361,601 filed June 15, 1953, now Patent No. 2,792,140 dated May 14, 1957.

We claim:

1. A power transmission for a material handling machine comprising a transmission housing, a power input shaft rotatably mounted in said housing, high and low speed gears secured to said input shaft, an intermediate shaft, low speed gear means rotatably mounted on the intermediate shaft and drivably engaging the low speed gear on said input shaft, high speed gear means rotatably mounted on said intermediate shaft and drivably engaging the high speed gear on said input shaft, first friction clutch means releasably securing said low speed gear means to said intermediate shaft, second friction clutch means releasably securing said high speed gear means to said intermediate shaft, a power output shaft, and reversing gear means connecting said intermediate shaft to said power output shaft.

2. A power transmission for a material handling machine comprising a transmission housing, a power input shaft rotatably mounted in said housing, high and low speed gears secured to said input shaft, an intermediate shaft, low speed gear means rotatably mounted on the intermediate shaft and drivably engaging the low speed gear on said input shaft, high speed gear means rotatably mounted on said intermediate shaft and drivably engaging the high speed gear on said input shaft, first fluid pressure actuated clutch means releasably securing said low speed gear means to said intermediate shaft, second fluid pressure actuated clutch means releasably securing said high speed gear means to said intermediate shaft, a power output shaft, means connecting said intermediate shaft to said power output shaft, a second power output shaft, and means connecting said second power output shaft to said intermediate shaft.

3. A power transmission for a material handling machine having dual final drives comprising a transmission housing, a power input shaft rotatably mounted in said housing, high and low speed gears secured to said input shaft, an intermediate shaft, low speed gear means rotatably mounted on the intermediate shaft and drivably engaging the low speed gear on said input shaft, high speed gear means rotatably mounted on said intermediate shaft and drivably engaging the high speed gear on said input shaft, first fluid pressure actuated clutch means releasably securing said low speed gear means to said intermediate shaft, second fluid pressure actuated clutch means releasably securing said high speed gear means to said intermediate shaft, paired power output shafts, means connecting said intermediate shaft to each of said power output shafts, and torque shafts connecting said power output shafts to their respective final drives.

4. A power transmission as defined in claim 3 including means for actuating said first and second clutch means comprising a source of pressure fluid, a pressure fluid control valve, a conduit connecting the source of pressure fluid and the control valve, and a pair of conduit means connecting said control valve and each of the fluid pressure actuated clutch means, a portion of said conduit means comprising internal passages in said intermediate shaft.

5. A power transmission as defined in claim 4 including a governor drivably connected to the power input shaft, and means connecting the governor to said pressure fluid control valve, whereby the first and second fluid pressure actuated clutch means are controlled by the speed of the power input shaft.

6. A power transmission for a material handling machine having dual final drives comprising a transmission housing, a power input shaft rotatably mounted in said housing, high and low speed gears secured to said input shaft, an intermediate shaft, low speed gear means rotatably mounted on the intermediate shaft and drivably engaging the low speed gear on said input shaft, high speed gear means rotatably mounted on said intermediate shaft and drivably engaging the high speed gear on said input shaft, first fluid pressure actuated clutch means releasably securing said low speed gear means to said intermediate shaft, second fluid pressure actuated clutch means releasably securing said high speed gear means to said intermediate shaft, paired power output shafts, third gear means rotatably mounted on each of said output shafts and drivably connected to said intermediate shaft, third fluid pressure actuated clutch means releasably securing said third gear means to said power output shaft, fourth gear means rotatably mounted on each of said output shaft, fourth clutch means releasably connecting said fourth gear means to said power output shafts, idler gears drivably connecting each of said fourth gear means to said intermediate shaft, torque shafts connecting said power output shafts to their respective final drives, and means for selectively actuating said first, second, third and fourth clutch means.

7. A power transmission as defined in claim 6 wherein each of said fluid pressure actuated clutch means comprises a clutch housing secured to and rotatable with its associated shaft, spaced radially extending clutch discs mounted for rotation with the clutch housing, radially extending clutch discs mounted for rotation with the rotatably mounted gear means and extending between each of the clutch discs mounted for rotation with the clutch housing, a piston carrying a presser plate slidably mounted in the clutch housing, and spring means urging said piston and presser plate out of engagement with the clutch discs.

8. A power transmission as defined in claim 7 including means for actuating each of said clutches comprising a source of pressure fluid, valve means connected to said source of pressure fluid, and conduit means connecting said valve means and the clutch housing ahead of said piston.

9. A power transmission comprising a transmission housing, a power input shaft rotatably mounted in said housing, high and low speed gears secured to said input shaft, an intermediate shaft, low speed gear means rotatably mounted on the intermediate shaft and drivably engaging the low speed gear on said input shaft, high speed gear means rotatably mounted on said intermediate shaft and drivably engaging the high speed gear on said input shaft, first clutch means releasably securing said low speed gear means to said intermediate shaft, second clutch means releasably securing said high speed gear means to said intermediate shaft, a power output shaft, means connecting said intermediate shaft to said power output shaft, a second power output shaft, and means connecting said second power output shaft to said intermediate shaft.

10. A power transmission having dual output shafts comprising a transmission housing, a power input shaft rotatably mounted in said housing, high and low speed gears secured to said input shaft, an intermediate shaft, low speed gear means rotatably mounted on the intermediate shaft and drivably engaging the low speed gear on said input shaft, high speed gear means rotatably mounted on said intermediate shaft and drivably engaging the high speed gear on said input shaft, first fluid pressure actuated clutch means releasably securing said low speed gear means to said intermediate shaft, second fluid pressure actuated clutch means releasably securing said high speed gear means to said intermediate shaft, paired power output shafts, and means connecting said intermediate shaft to each of said power output shafts.

11. A power transmission as defined in claim 10 including means for actuating said first and second clutch means comprising a source of pressure fluid, a pressure fluid control valve, a conduit connecting the source of pressure fluid and the control valve, and a pair of conduit means connecting said control valve and each of the fluid pressure actuated clutch means, a portion of said conduit means comprising internal passages in said intermediate shaft.

12. A power transmission as defined in claim 11 including a governor drivably connected to the power input shaft, and means connecting the governor to said pressure fluid control valve, whereby the first and second fluid pressure actuated clutch means are controlled by the speed of the power input shaft.

13. A power transmission for a material handling machine having dual final drives comprising a transmission housing, a power input shaft rotatably mounted in said housing, high and low speed gears secured to said input shaft, an intermediate shaft, low speed gear means rotatably mounted on the intermediate shaft and drivably engaging the low speed gear on said input shaft, high speed gear means rotatably mounted on said intermediate shaft and drivably engaging the high speed gear on said input shaft, first fluid pressure actuated clutch means releasably securing said low speed gear means to said intermediate shaft, second fluid pressure actuated clutch means releasably securing said high speed gear means to said intermediate shaft, paired power output shafts, third gear means rotatably mounted on each of said output shafts and drivably connected to said intermediate shaft, third fluid pressure actuated clutch means releasably securing said third gear means to said power output shafts, fourth gear means rotatably mounted on each of said output shafts, fourth clutch means releasably connecting said fourth gear means to said power output shafts, idler gears drivably connecting each of said fourth gear means to said intermediate shaft, torque shafts connecting said power output shafts to their respective final drives, means for selectively actuating said first, second, third and fourth clutch means, including a source of pressure fluid, valve means, conduit means connecting the valve means to said source of pressure fluid, conduit means connecting said valve means and the clutch housing ahead of each piston and an orificed restrictor in said conduit means between the valve means and the source of pressure fluid to restrict the flow of pressure fluid to said piston without reducing the final pressure thereof.

14. A power transmission for a vehicle comprising a transmission housing, a power input shaft, a power output shaft and an intermediate shaft each rotatably mounted in said housing in parallel relationship, first gear trains arranged to drive said output shaft through said intermediate shaft at different speeds, second gear trains arranged to drive said output shaft through said intermediate shaft in opposite directions, and clutch means for establishing drive from said input shaft through said first and second gear trains and said intermediate shaft to said output shaft, said clutch means including dual clutch means on said output shaft, and a second power output shaft and means connecting said second power output shaft to said power input shaft.

15. A power transmission including a power input shaft, a power output shaft and an intermediate shaft, constant mesh change speed gears interconnecting the input shaft and the intermediate shaft, engageable and disengageable friction clutch means cooperating with the constant mesh change speed gears to drive the intermediate shaft at selected speeds, forward and reverse gears interconnecting the intermediate shaft and the output shaft and engageable and disengageable friction clutch means on said output shaft for selectively driving the output shaft in forward and reverse directions and a governor drivably connected to the power input shaft, and means connected to the governor for actuating said friction clutch means for the change speed gears whereby said friction clutch means are controlled by the speed of the power input shaft.

16. A power transmission for a vehicle comprising a transmission housing, a power input shaft, a power output shaft and an intermediate shaft each rotatably mounted in said housing in parallel relationship, first gear trains arranged to drive said output shaft through said intermediate shaft at different speeds, second gear trains arranged to drive said output shaft through said intermediate shaft in opposite directions, and clutch means for establishing drive from said input shaft through said first and second gear trains and said intermediate shaft to said output shaft, said clutch means including dual clutch means on said output shaft, and means for lubricating said gearing and clutch means comprising a source of lubricant, conduit means connecting said source with the gearing and clutch means, said means including internal passages in said shafts whereby lubrication is aided by centrifugal force pouring lubricant outward from the driven shaft.

17. The invention defined in claim 16 including pressure fluid restrictor means to limit the flow of lubricant to the gearing and the clutch means.

18. A power transmission comprising a transmission housing, a power input shaft rotatably mounted in said housing, high and low speed gears secured to said input shaft, an intermediate shaft, low speed gear means rotatably mounted on the intermediate shaft and drivably engaging the low speed gear on said input shaft, high speed gear means rotatably mounted on said intermediate shaft and drivably engaging the high speed gear on said input shaft, first fluid pressure actuated clutch means releasably securing said low speed gear means to said intermediate shaft, second fluid pressure actuated clutch means releasably securing said high speed gear means to said intermediate shaft, paired power output shafts, and means connecting said intermediate shaft to each of said power output shafts.

19. The invention defined in claim 18 including a governor drivably connected to the power input shaft, means for actuating the first and second fluid pressure actuated clutch means, and means connected to the governor for actuating said clutch actuating means whereby the first and second clutch means are controlled by the speed of the power input shaft.

20. A power transmission comprising a transmission housing, a power input shaft rotatably mounted in said housing, high and low speed gears secured to said input shaft, an intermediate shaft, low speed gear means rotatably mounted on the intermediate shaft and drivably engaging the low speed gear on said input shaft, high speed gear means rotatably mounted on said intermediate shaft and drivably engaging the high speed gear on said input shaft, first clutch means releasably securing said low speed gear means to said intermediate shaft, second clutch means releasably securing said high speed gear means to said intermediate shaft, paired power output shafts, third gear means rotatably mounted on each of said output shafts and drivably connected to said intermediate shaft, third clutch means releasably securing said third gear means to said power output shafts, fourth gear means rotatably mounted on each of said output shafts, fourth clutch means releasably connecting said fourth gear means to said power output shafts, idler gears drivably connecting each of said fourth gear means to said intermediate shaft, and means for selectively actuating said first, second, third and fourth clutch means.

21. In a constant mesh gear transmission including at least a power input shaft, a power output shaft and gears interconnecting said shafts, means for selectively driving the output shaft through some of the gears comprising a radially extending flange secured to one of the shafts, a cylinder secured to the flange and extending coaxially about a portion of said shaft, a sleeve rotatably mounted on said shaft, one end of said sleeve extending under a portion of the cylinder, a gear secured to the other end of said sleeve, radially extending clutch discs alternately mounted for rotation with said cylinder and said sleeve, a pressure fluid actuated piston slidably mounted between said sleeve and said cylinder for urging said discs into frictional engagement whereby said sleeve and said gear will rotate with said shaft, duct means connecting the fluid actuated piston to a source of pressure fluid through a control valve, and an orificed restrictor in said duct between said source of pressure fluid and said control valve to restrict the flow of pressure fluid to the valve whereby the flow of pressure fluid to said piston is restricted without reducing the final pressure thereof.

22. A power transmission comprising a transmission housing, a power input shaft rotatably mounted in said housing, paired power output shafts, first gear means rotatably mounted on each of said output shafts, first clutch means releasably securing said first gear means to said output shafts, second gear means rotatably mounted on each of said output shafts and drivably connected to said input shaft, second clutch means releasably securing said second gear means to said output shafts, and reversing gear means drivably connecting said first gear means to said input shaft.

23. A power transmission for a vehicle comprising a transmission housing, a power input shaft, drive gears secured to said power input shaft, a power output shaft and an intermediate shaft each rotatably mounted in said housing in parallel relationship, first gear trains arranged to drive said output shaft through said intermediate shaft at different speeds, second gear trains arranged to drive said output shaft through said intermediate shaft in opposite directions, and clutch means for establishing drive from the gears secured to said input shaft through said first and second gear trains and said intermediate shaft to said output shaft, said clutch means including dual clutch means on said output shaft.

24. A power transmission including a power input shaft, a power output shaft and an intermediate shaft, constant mesh change speed gears interconnecting the input shaft and the intermediate shaft, said constant mesh change speed gears including gears secured to said input shaft, engageable and disengageable friction clutch means cooperating with the constant mesh change speed gears to drive the intermediate shaft at selected speeds, forward and reverse gears interconnecting the intermediate shaft and the output shaft and engageable and disengageable friction clutch means on said output shaft for selectively driving the output shaft in forward and reverse directions.

25. A power transmission including a power input shaft, a power output shaft and an intermediate shaft, constant mesh change speed gears interconnecting the input shaft and the intermediate shaft, engageable and disengageable clutch means cooperating with the constant mesh change speed gears to drive the intermediate shaft at selected speeds; forward and reverse gears interconnecting the intermediate shaft and the output shaft, engageable and disengageable clutch means on said output shaft for selectively driving the output shaft in forward and reverse directions, a second output shaft, forward and reverse gearing connecting the second output shaft and the intermediate shaft, and engageable and disengageable clutch means on said second output shaft for selectively driving the second output shaft in the forward and reverse direction.

26. A power transmission including a power input shaft, said power input shaft having drive gears secured thereto, a power output shaft, and an intermediate shaft, each of said shafts rotatably mounted in a housing in parallel relationship, constant mesh change speed gear means interconnecting the intermediate shaft and one of the other of said shafts, constant mesh forward and reverse gear means interconnecting the intermediate shaft and the other of said shafts, engageable and disengageable friction clutch means cooperating with said constant mesh change speed and reversing gears to selectively drive said output shaft at preselected speeds and directions relative to the input shaft.

27. A power transmission including a power input shaft, a power output shaft, and an intermediate shaft, constant mesh change speed gear means interconnecting the intermediate shaft and one of the other of said shafts, constant mesh forward and reverse gear means interconnecting the intermediate shaft and the other of said shafts, engageable and disengageable friction clutch means cooperating with said constant mesh change speed and reversing gears to selectively drive said output shaft at preselected speeds and directions relative to the input shaft, a second power output shaft, and gear means interconnecting said second power output shaft and said power input shaft.

28. A power transmission including a power input shaft, drive gears secured to said power input shaft, a power output shaft and an intermediate shaft, constant mesh change speed gear means carried by and interconnecting the intermediate shaft and one of the other of said shafts, engageable and disengageable friction clutch means cooperating with the shafts carrying the change speed gear means, constant mesh reversing gear means carried by and interconnecting the intermediate shaft and the other of said shafts, engageable and disengageable friction clutch means coaxial wth one of the shafts carrying the reversing gear means, whereby the output shaft is selectively driven by the input shaft through the intermediate shaft in opposite directions and at different speeds.

29. A power transmission including a power input shaft, a power output shaft and an intermediate shaft, constant mesh change speed gear means carried by and interconnecting the intermediate shaft and one of the other of said shafts, engageable and disengageable friction clutch means cooperating with the shafts carrying the change speed gear means, constant mesh reversing gear means carried by and interconnecting the intermediate shaft and the other of said shafts, engageable and disengageable friction clutch means coaxial with one of the shafts carrying the reversing gear means, whereby the output shaft is selectively driven by the input shaft through the intermediate shaft in opposite directions and at different speeds, a second power output shaft and further constant mesh gear means, and engageable and disengageable friction clutch means to selectively drive the second output shaft in opposite directions and at different speeds from the input shaft.

30. A power transmission for a vehicle comprising a transmission housing, a power input shaft, a pair of power output shafts, and an intermediate shaft each rotatably mounted in said housing in parallel relationship, first gear trains arranged to drive each of said power output shafts through said intermediate shaft at different speeds, second gear trains arranged to drive each of said power output shafts through said intermediate shaft in opposite directions, and clutch means for establishing drive from said power input shaft through said first and second gear trains and said intermediate shaft to each of said power output shafts, said clutch means including dual clutch means on each of said power output shafts.

31. The power transmission defined in claim 27 wherein the gear means interconnecting the second power output shaft and the power input shaft includes constant mesh change speed gears, and constant mesh forward and reverse gears, and engageable and disengageable friction clutch means cooperating with said constant mesh change speed and reversing gears to selectively drive said second power output shaft at preselected speeds and directions relative to the input shaft.

32. The power transmission defined in claim 29 wherein the further constant mesh gear means and engageable and disengageable friction clutch means selectively driving the second power output shaft from the input shaft include constant mesh change speed gears and constant mesh forward and reverse gears, and engageable and disengageable friction clutch means cooperating with said constant mesh change speed and reversing gears.

33. The power transmission as defined in claim 32 wherein the second power output shaft is selectively driven by said input shaft through said intermediate shaft.

References Cited in the file of this patent

UNITED STATES PATENTS

| | | |
|---|---|---|
| 1,979,488 | Perez | Nov. 6, 1934 |
| 2,131,531 | Behrens | Sept. 27, 1938 |
| 2,304,032 | Schmitter | Dec. 1, 1942 |
| 2,323,753 | Jaeger et al. | July 6, 1943 |
| 2,375,524 | Clarke | May 8, 1945 |
| 2,430,799 | Aspinwall | Nov. 11, 1947 |
| 2,484,011 | Brunken et al. | Oct. 11, 1949 |
| 2,547,732 | Baker | Apr. 3, 1951 |
| 2,560,865 | Hindmarch | July 17, 1951 |
| 2,606,456 | Dodge | Aug. 12, 1952 |
| 2,632,544 | Hockert | Mar. 24, 1953 |
| 2,720,124 | Polomski | Oct. 11, 1955 |
| 2,815,684 | Roche | Dec. 10, 1957 |
| 2,825,232 | Sieving et al. | Mar. 4, 1958 |